(12) United States Patent
Hu et al.

(10) Patent No.: US 9,146,100 B2
(45) Date of Patent: Sep. 29, 2015

(54) WIND TURBINE CONDITION MONITORING METHOD

(75) Inventors: Xi Hu, Beijing (CN); Qing Gang Wang, Beijing (CN); Jian Hui Xing, Beijing (CN); Yue Zhuo, Beijing (CN)

(73) Assignee: SIEMENS AKTIENGESELLSCHAFT, München (DE)

( * ) Notice: Subject to any disclaimer, the term of this patent is extended or adjusted under 35 U.S.C. 154(b) by 568 days.

(21) Appl. No.: 13/560,211

(22) Filed: Jul. 27, 2012

(65) Prior Publication Data

US 2013/0187783 A1 Jul. 25, 2013

(30) Foreign Application Priority Data

Jul. 29, 2011 (CN) .......................... 2011 1 0217278

(51) Int. Cl.
*G06F 19/00* (2011.01)
*G01B 3/44* (2006.01)
*G01B 21/16* (2006.01)
*F03D 11/00* (2006.01)

(52) U.S. Cl.
CPC ............ *G01B 21/16* (2013.01); *F03D 11/0091* (2013.01); *F05B 2260/80* (2013.01); *Y02E 10/722* (2013.01)

(58) Field of Classification Search
CPC ..... Y02E 10/722; Y02E 10/723; Y02E 10/20; F03D 11/0091; F03D 7/042; F03D 11/0008; F03D 11/02; F03D 7/0292; G01M 13/045; G01M 5/0033; G01M 5/0066; G01M 13/028; F05B 2260/80; F05B 2270/1095; F05B 2270/329; F05B 2270/332; F05B 2270/706; F05B 2270/807; F05B 2270/334; G01H 1/003; B29C 44/569; B29C 51/082; B29C 51/14; D01F 9/12; G06M 13/285; G06M 13/325; G06M 13/46; G06M 15/55; G06M 15/555; G06M 2101/40; G06M 2200/40; G06M 2200/50
USPC ........... 702/34, 56, 71, 75, 94, 106, 150, 183, 702/188; 340/658; 290/44
See application file for complete search history.

(56) References Cited

U.S. PATENT DOCUMENTS

| 7,822,560 B2 * | 10/2010 | LeMieux ........................ 702/34 |
| 7,912,659 B2 * | 3/2011 | Luo ................................. 702/56 |
| 2013/0006540 A1 * | 1/2013 | Sakaguchi et al. .............. 702/34 |

FOREIGN PATENT DOCUMENTS

| CN | 1690675 A | 11/2005 |
| CN | 101377664 A | 3/2009 |
| CN | 101858778 A | 10/2010 |
| CN | 101995336 A | 3/2011 |

* cited by examiner

*Primary Examiner* — John H Le
(74) *Attorney, Agent, or Firm* — Henry M. Feiereisen LLC.

(57) ABSTRACT

A wind turbine condition monitoring method includes the steps of generating in advance a reference curve for normal operation of a transmission chain of a wind turbine using position information, measuring position information and generating an actual condition monitoring curve; comparing the actual condition monitoring curve with the reference curve, and determining the current condition of the wind turbine from the comparison. With the proposed monitoring method, monitoring with a high signal-to-noise ratio can be achieved with minimal or no addition of hardware, such as an A/D module; moreover, computational task is greatly reduced, so that the monitoring system can be more easily integrated into the main control system. In addition, the position measurement system is more stable than a vibration measurement system, and the monitoring result is more reliable.

7 Claims, 4 Drawing Sheets

WIND TURBINE CONDITION MONITORING METHOD

CROSS-REFERENCES TO RELATED APPLICATIONS

This application claims the priority of Chinese Patent Application, Serial No. 201110217278.0, filed Jul. 29, 2011, pursuant to 35 U.S.C. 119(a)-(d), the content of which is incorporated herein by reference in its entirety as if fully set forth herein.

BACKGROUND OF THE INVENTION

The present invention relates to a condition monitoring method, in particular to a wind turbine condition monitoring method.

The following discussion of related art is provided to assist the reader in understanding the advantages of the invention, and is not to be construed as an admission that this related art is prior art to this invention.

Condition monitoring systems are becoming ever more important in today's wind turbine systems. The condition monitoring system method is capable of preventing wind turbine shutdown on account of premature serious damage, as well as optimizing the maintenance scheme of the wind turbine and preventing erroneous replacement of non-faulty parts. Even in the case of wind turbines on land, condition monitoring systems are becoming indispensable, as without them a wind turbine cannot be certified by the certifying body and is difficult to insure.

However, wind turbine condition monitoring methods in the prior art have the problem of high cost. Customers demand cheap wind turbines, so that wind power can compete with traditional energy sources. However, currently used condition monitoring methods use costly sensors, signal sampling modules and high-performance industrial computers, which form an on-line monitoring point. Thus, in consideration of costs, existing condition monitoring systems only monitor the main drive chain which is most important, abandoning monitoring of the variable pitch propeller and yaw transmission systems. As a result, wind turbine condition monitoring methods in the prior art have the shortcoming that they are unable to comprehensively monitor the main equipment, due to cost limitations.

Hence, if costs are to be prevented from increasing or even reduced when monitoring the entire transmission system of a wind turbine, including the transmission chain, variable pitch propeller and yaw transmission systems, then a new monitoring method must be employed.

Moreover, in the prior art, condition monitoring methods for wind turbines include analysis of signal data such as vibration, acoustics, lubricating oil, generator current signals, temperature and torque.

Vibration analysis is the most widely applied technology in the field of industry on account of its reliability and standardization, and is currently the most commonly used technology in wind turbine condition monitoring. However, since vibration analysis can only monitor those parts of the wind turbine with low rotation speeds, its performance is limited and the system costs are high.

Acoustical analysis is another technology similar to vibration. Acoustical analysis is applicable to low-speed rotation, and is capable of detecting faults at an early stage, but requires an extremely high sampling frequency, which leads to higher costs. Oil/fragment analysis is a commonly used technology in off-line monitoring, used to detect the state of wear of gearwheels and bearings, but is costly when implemented in an on-line system, and is largely unable to monitor bearing defects in a closed-loop oil supply system. Temperature monitoring is another standardized technology, used to avoid operation at high temperature, but it is incapable of further analysis to determine whether or not a rise in temperature is due to a defect. Electric current analysis is mostly seen in academic theses, for the detection of generator faults, for instance open circuits or short circuits, broken rotor bar faults or motor air gap eccentricity, but has been unable to enter industrial application because it has a low signal-to-noise ratio, is unable to achieve early-stage fault detection and has a limited application scope. Torque measurement is still in the research stage and has a high cost, and is unable to monitor an entire transmission chain.

Thus, wind turbine transmission monitoring methods in the prior art are not applicable to variable pitch propeller and yaw systems of wind turbines; a new, economical and effective monitoring method is required.

It would therefore be desirable and advantageous to obviate prior art shortcomings and to provide an improved wind turbine transmission monitoring method which can be used with variable pitch propeller and yaw systems and which is economical to implement.

SUMMARY OF THE INVENTION

According to one aspect of the present invention, a wind turbine condition monitoring method of the present invention includes the steps of - generating in advance a reference curve for normal operation of a transmission chain of a wind turbine using position information, measuring position information and generating an actual condition monitoring curve for the transmission chain of the wind turbine, and comparing the actual condition monitoring curve with the initially generated reference curve to determine therefrom the actual current condition of the wind turbine.

The condition monitoring method of the present invention does not require the installation of additional sensors or the collection of large amounts of data to perform condition analysis, but is capable of monitoring the condition of the wind turbine simply by using position signals on the transmission chain and a small amount of calculation.

According to an advantageous feature of the present invention, the actual condition monitoring curve may be a transfer function waveform; the transfer function waveform can be readily obtained by a measurement, and hence facilitates monitoring of the wind turbine.

According to an advantageous feature of the present invention, the reference curve may be an ideal transfer function; the establishment of the ideal transfer function is simple and convenient, and simplifies the process of establishing the reference curve.

According to another advantageous feature of the present invention, the reference curve may be a long-term monitoring baseline; the establishment of the long-term monitoring baseline enables the reference curve to better conform to the actual situation, thereby improving the reliability of the monitoring result.

According to an advantageous feature of the present invention, the long-term monitoring baseline may be obtained by accumulating normal condition data in a known normal operating condition, performing probability analysis on the accumulated normal condition data, removing curves with relatively large deviation, and abnormal points, and forming the long-term monitoring baseline of the wind turbine.

By way of the above steps, with the acquired data being subjected to analysis and removal, the long-term monitoring baseline finally obtained will be more reliable.

According to an advantageous feature of the present invention, the actual condition monitoring curve may be a backlash distribution waveform; the backlash distribution waveform can further improve the reliability of the monitoring result.

According to another advantageous feature of the present invention, the transmission chain of the wind turbine may include a main transmission chain, a variable pitch propeller transmission chain or a yaw transmission chain, or a combination thereof. The actual condition of the wind turbine can be determined more comprehensively and accurately by monitoring each of the main transmission chains of the wind turbine.

According to an advantageous feature of the present invention, the actual condition of the wind turbine may include a dynamic defect and/or a static defect, due to monitoring an actual condition which includes a dynamic defect and/or a static defect.

According to an advantageous feature of the present invention, comparing the actual condition monitoring curve with the reference curve may further include the steps of generating a residual curve after comparing, monitoring the residual curve, and sending out a warning if the residual curve exceeds a threshold value.

According to another advantageous feature of the present invention, comparing the actual condition monitoring curve with the reference curve may further include the steps of performing frequency domain analysis on the actual condition monitoring curve, monitoring a characteristic fault frequency band, and sending out a warning if the amplitude of the characteristic fault frequency band exceeds a threshold value.

It can be seen from the above solutions that by way of the wind turbine monitoring method of the present invention, monitoring with a high signal-to-noise ratio can be achieved with minimal or even no hardware investment, and with no need for an AID module to be installed; in addition, the amount of computational tasks is greatly reduced, so that the monitoring system can be more easily integrated into the main control system. Furthermore, the position measurement system is more stable than a vibration measurement system, and is capable of diagnosing not only dynamic defects (wear, pitting, fractures, etc.) but also static defects (improper machining).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
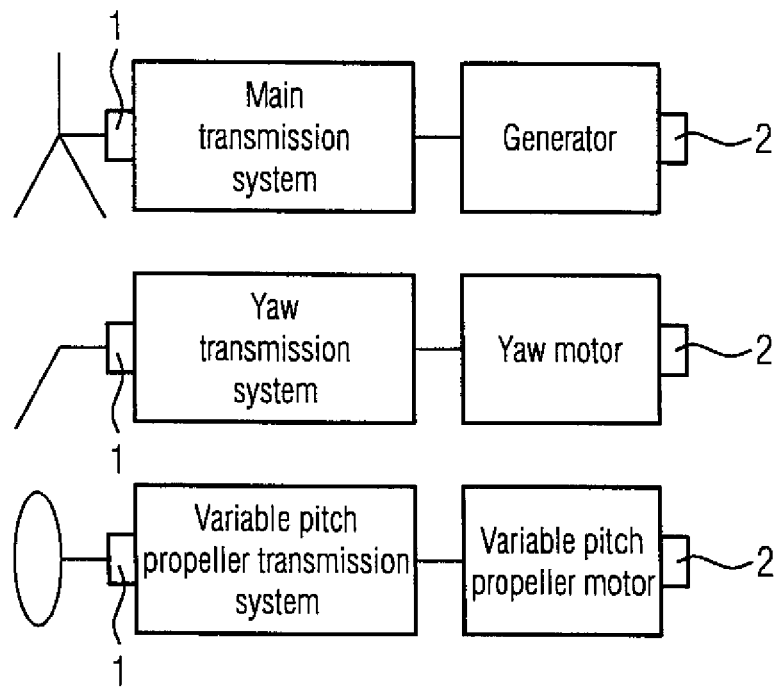
FIG. 1 is a schematic diagram of sensor mounting positions for implementing the method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Current wind turbines principally include, but are not limited to, the following three transmission chains: a main transmission chain, a variable pitch propeller system transmission chain and a yaw system transmission chain. The principal function of the above three transmission chains is to transfer motion from a driving end to a non-driving end at an appropriate ratio. In the case of a wind turbine specifically, the main transmission chain is used to transfer the energy of the blades to the generator; the variable pitch propeller transmission chain is used to transfer motive power from a motor to the variable pitch propeller system, so that the blades face in the direction of incoming wind at the most suitable angle of attack; while the yaw transmission chain is used to transfer motive power from a motor to the yaw system, so that the blades always face in the direction of incoming wind and thereby receive wind energy to the maximum extent possible. In an ideal wind turbine transmission chain, motion should be transferred smoothly and linearly. However, if there is any fault or defect, the transfer of motion will suffer interference, and the characteristics of the fault will be introduced into the transfer of motion. The monitoring method according to the present invention employs monitoring and diagnostic analysis of the motion transfer condition in each of the transmission chains in the wind turbine.

Turning now to the drawing, and in particular to FIG. 1, there are shown position sensors 1 and 2 are respectively mounted at the starting ends and terminal ends used for the three transmission chains, so as to collect position signals of the respective mounting sites for realizing the monitoring method of the present invention. A method of mounting by adhesion may be employed to connect the sensors 1 and 2 to the two ends of the transmission chains. In the present description of the invention, the terms "sensor" and "encoder" are used equivalently.

The specific implementation steps of the monitoring method according to the present invention are described in detail below with reference to FIGS. 2-8.

Specifically, the monitoring method according to the present invention implements fault characteristic extraction according to the following two motion waveforms: transfer function waveform and backlash distribution waveform.

A condition monitoring method carried out using a transfer function waveform will be described first with reference to the accompanying drawings. As shown in FIG. 1, a motion measurement step is performed first, that is to say, the two sets of position encoders 1 and 2 are used to measure the motion transferred by the transmission system at the starting ends and terminal ends of the transmission chains, respectively. In the embodiments of the present invention, one of the two sets of encoders is reference encoders. If the transmission chain ratio is greater than 1, the set of encoders at the terminal end serves as the reference encoders; otherwise, the set of encoders at the starting end serves as the reference encoders. When the transmission chain is running, the two sets of encoders record position points simultaneously, thereby generating two position waveforms with a common time axis. Generally, there are fewer position points from the non-reference encoders than from the reference encoders. Next, the data collected by the non-reference encoders is adjusted according to the transmission system ratio and interpolation is performed thereon, so that a corresponding point is generated for each point on the corresponding reference encoder. Finally, a transfer function waveform is constructed from a series of position differences of position waveforms of the two sets of encoders, with the X axis being converted from time points to reference encoder positions. For the same transmission chain, the transfer function curves for the two directions of rotation may have different shapes.

Figure 2:
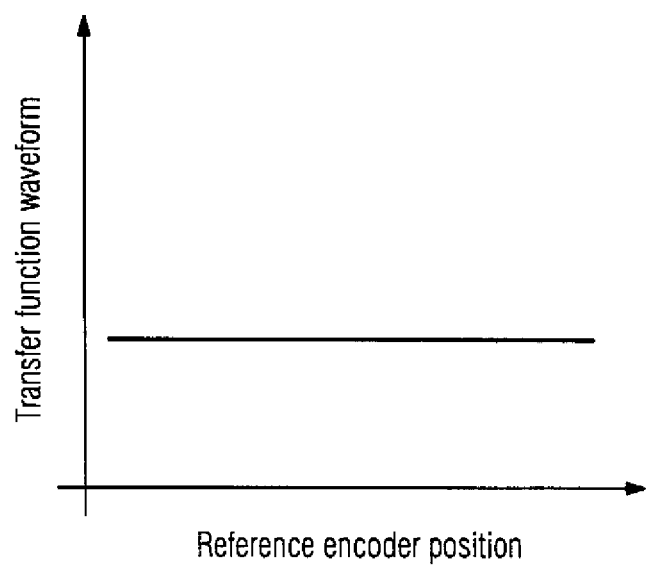
FIG. 2 is an ideal transfer function waveform graph in the monitoring method according to the present invention.

In the case of an ideal transmission chain, the transfer function waveform will be a straight line, as shown in FIG. 2. However, if there are defects in the machining or assembly of the transmission chain, or long-term operation leads to wear or other defects, distortion will arise in the transfer function curve. The monitoring/diagnosis method according to the present invention can extract characteristics with defects from the distortion, including making comparison with the ideal transfer function or the long-term monitoring baseline, etc., and perform frequency or time-frequency analysis.

Figure 3:
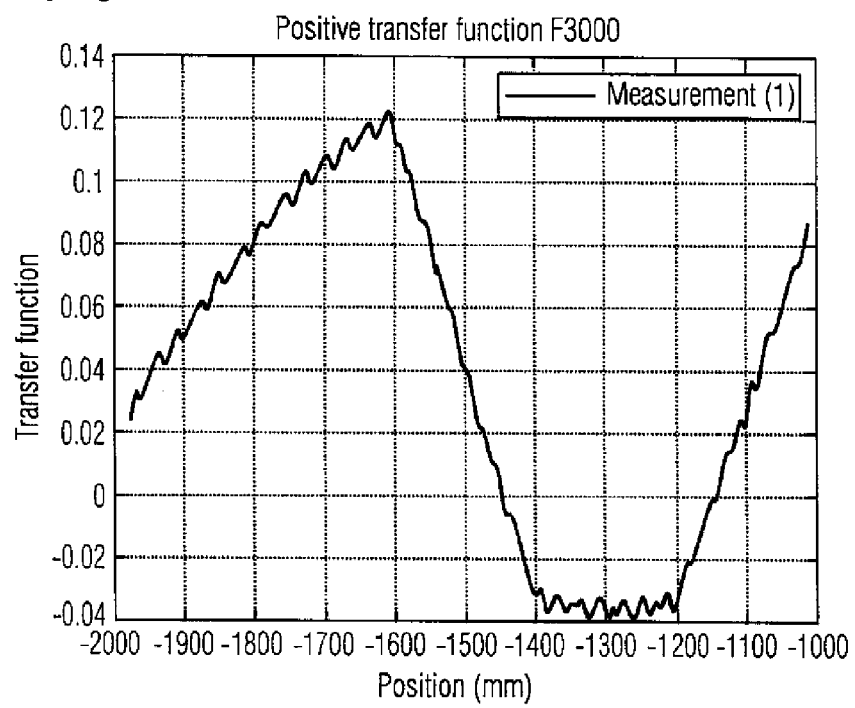
FIG. 3 is a graph of a piecewise transfer function waveform in the monitoring method according to the present invention.

Any distortion of the ideal transfer function waveform may indicate machining or assembly defects, or even component damage. For example, FIG. 3 shows a transfer function waveform displaying piecewise linearity; it shows that gearwheels in a transmission chain have not been machined with the same pitch.

Figure 4:
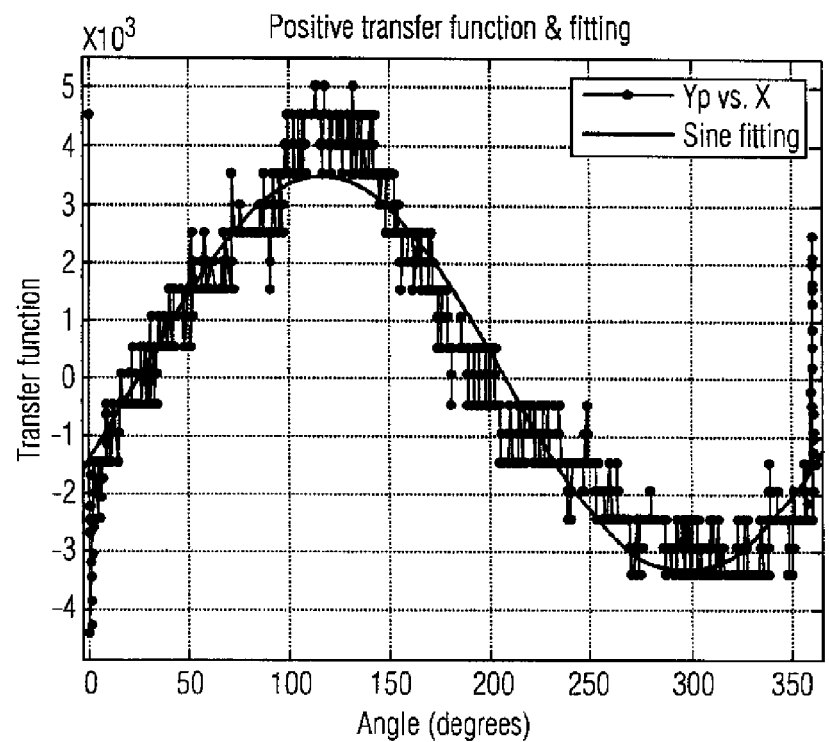
FIG. 4 is a graph of a sine transfer function waveform in the monitoring method according to the present invention.
Figure 5:
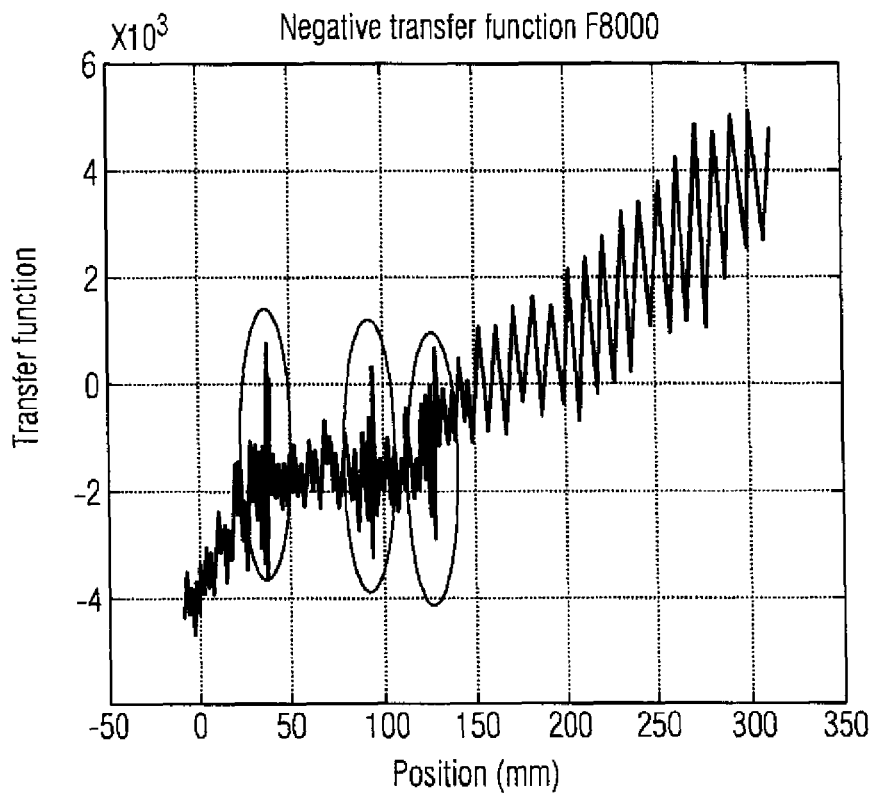
FIG. 5 is a graph of a transfer function waveform with interference in the monitoring method according to the present invention.

FIG. 4 is a typical transfer function waveform arising from a transmission chain that is not balanced or has not been centered, and displays a sinusoid form. In another embodiment, using further frequency domain analysis, an unbalanced/non-centered shaft can be located by tracking the rotation frequency and harmonics of each shaft. There are several abnormal peaks in FIG. 5, indicating that the transferred motion has suffered interference at these points, perhaps arising from pollution or local defects.

In another embodiment, the present invention may employ direct comparison, i.e. establish a reference baseline for each transfer function waveform. The reference baseline is the shape that the transfer function waveform should have when the transmission chain has no defects whatsoever. The reference baseline can be established by accumulating a set of transfer function waveforms within a period of time (during which period of time the transmission chain has no defects). During long-term monitoring, a newly acquired transfer function waveform is compared with the reference baseline and the deviation there between analyzed, including the absolute deviation, the deviation speed and deviation waveform statistics. A threshold value can also be determined according to the type of transmission system, the operating condition and the baseline thereof. When the number of characteristics monitored exceeds the threshold value, this indicates that certain components in the transmission system are already in a poor condition, and should be examined, overhauled or even replaced.

Figure 6:
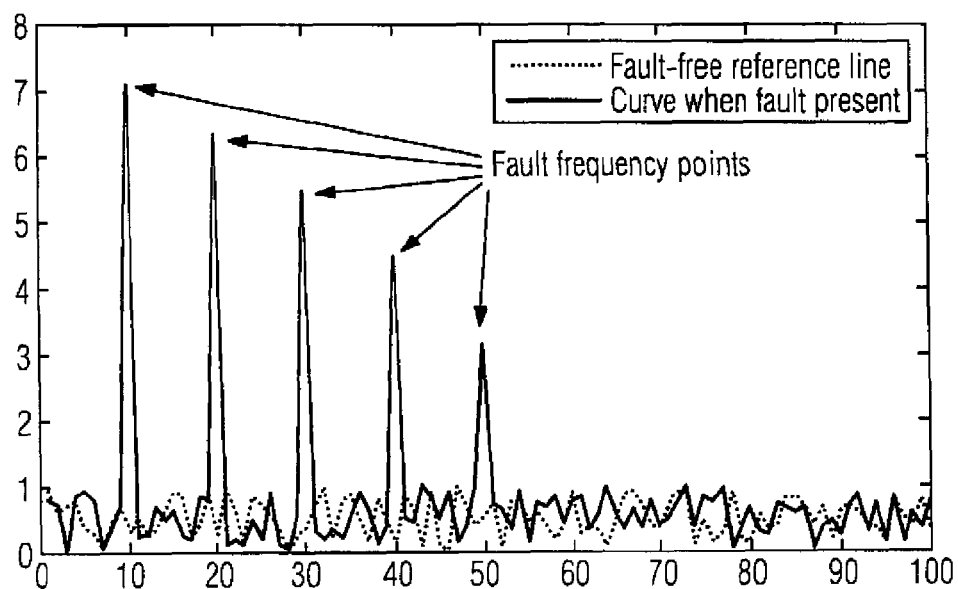
FIG. 6 is a schematic diagram of frequency analysis performed on the transfer function with interference in the monitoring method according to the present invention.

In addition, in some embodiments, the transfer function waveform can be analyzed in the frequency domain. This analysis indicates which component is damaged, and can even find defects in an early stage. FIG. 6 shows the result of analysis for one transmission chain, in which the inside surface of a bearing has the defect of peeling. The first ten measurements were carried out in a defect-free condition, thereby generating a reference; the last ten measurements were carried out in a defective condition. Comparing the first ten measurements with the last ten, there was a notable increase in the inner ring defect frequency and the harmonics and sidebands thereof in the last ten measurements.

Figure 8:
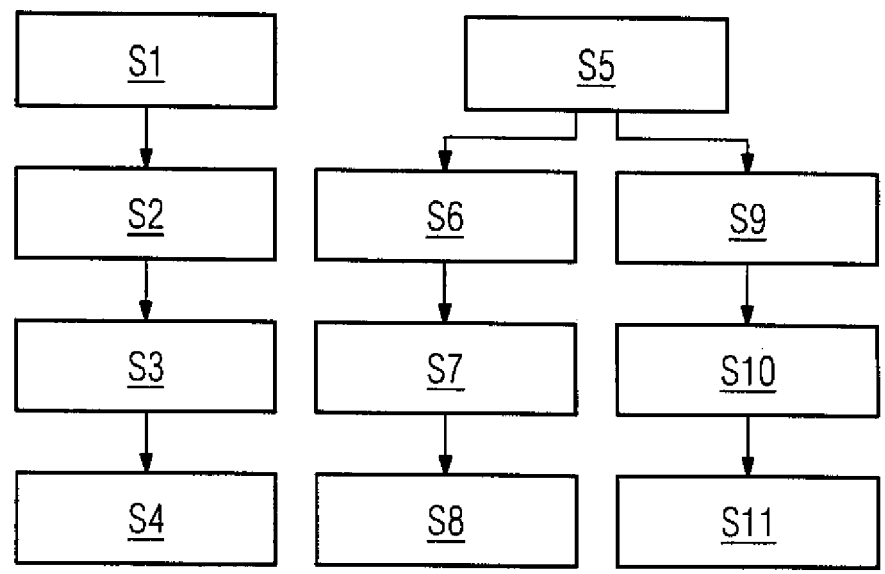
FIG. 8 is a flow chart of the monitoring method according to the present invention.

Besides direct comparison with the ideal reference baseline, another preferable method is to establish a reference baseline by way of long-term change monitoring, and then to carry out analysis comparison with the actual condition monitoring curve. As shown in FIG. 8, long-term change monitoring includes the steps: S1, accumulating data of a known operating condition, and storing the accumulated data in a database; S2, performing probability analysis on the data accumulated in the database using a corresponding data processing tool; S3, after performing probability analysis on the accumulated data, removing curves with relatively large deviation, and abnormal points; and then performing step S4, to form a reference curve for the wind turbine during normal operation.

The monitoring method of the present invention also includes step S5, measuring a position information curve; this can include the following two ways of implementation. The first way is to perform S6 after S5, performing comparison with the reference curve in order to generate a residual curve, and then to perform step S7 in which the residual curve is monitored, and to finally perform step S8, warning if the residual curve exceeds a threshold value.

In another embodiment, once an actual position information curve has been established in S5, S9 can be performed, wherein frequency domain analysis is performed directly on this curve; S10 is then performed, wherein a characteristic fault frequency band is monitored; and finally S11 is performed, wherein a warning is given when the amplitude exceeds a preset threshold.

A monitoring method carried out using a backlash distribution waveform will be described next, with reference to the accompanying drawings.

Figure 7:
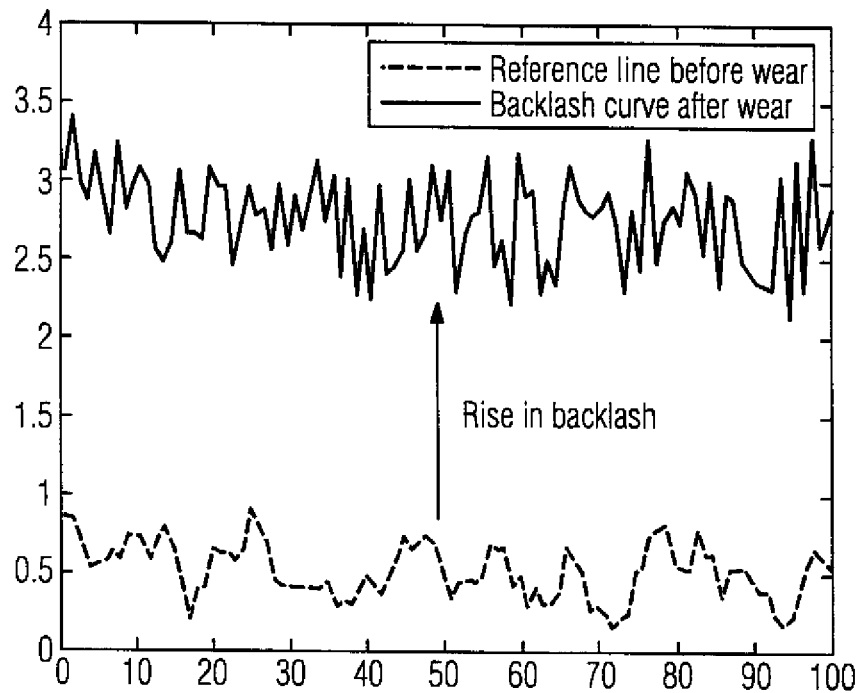
FIG. 7 is a schematic diagram of a backlash distribution waveform in the monitoring method according to the present invention.

Here, the backlash distribution waveform shows the backlash distribution along the circumferential direction of a transmission chain, and can be calculated using the difference values of transfer function curves in two directions. For example, when the transmission chain is in its working life period, the gearwheels are in the process of being worn, and the backlash distribution waveform will gradually rise, as shown in FIG. 7. The standard deviation of the backlash distribution waveform also rises. Moreover, loosening will also cause the backlash waveform to rise, but the waveform will rise rapidly and the change in standard deviation will not be very large. The backlash distribution waveform and the motion transfer waveform are both optional forms of monitoring curve.

In summary, by using the wind turbine condition monitoring method according to the present invention, minimal or even no hardware investment is needed, and an A/D module is not required (A/D= analog-to-digital). In addition, the wind turbine condition monitoring method according to the present invention can achieve a monitoring result with a high signalto-noise ratio; at the same time, the large amount of calculation required in the prior art during the monitoring process is greatly reduced, so that the monitoring system can be more easily integrated into the main control system. Furthermore, the position measurement system is more stable than the vibration measurement system in the prior art, being capable of diagnosing not only dynamic defects (wear, pitting, fractures, etc.) but also static defects (improper machining).

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for monitoring a condition of a transmission chain of a wind turbine, comprising the steps of:
   generating normal condition data with sensors located at a first position of the transmission chain and at a second position of the transmission chain of the wind turbine under a known normal operating condition when the transmission chain has no defects, by:
   accumulating the generated normal condition data;
   storing the accumulated data in a database;
   with a data processing tool, performing probability analysis on the accumulated normal condition data, removing curves with relatively large deviations and abnormal points, and generating a long-term monitoring baseline of the transmission chain of the wind turbine after the curves are removed;
   generating with the sensors located at the first and second position of the transmission chain an actual condition monitoring curve for the transmission chain of the wind turbine;
   with the data processing tool, comparing the actual condition monitoring curve with the long-term monitoring baseline in a frequency domain or a time domain; and
   determining an actual condition of the wind turbine from the comparison.

2. The method of claim 1, wherein the actual condition monitoring curve is a transfer function waveform.

3. The method of claim 1, wherein the actual condition monitoring curve is a backlash distribution waveform.

4. The method of claim 1, wherein the transmission chain of the wind turbine includes at least one of a main transmission chain, a variable pitch propeller transmission chain and a yaw transmission chain.

5. The method of claim 1, wherein the actual condition of the wind turbine includes at least one of a dynamic defect and a static defect.

6. The method of claim 1, wherein comparing of the actual condition monitoring curve with the long-term monitoring baseline further comprises the steps of:
   generating a residual curve after comparing;
   monitoring the residual curve; and
   sending out a warning if the residual curve exceeds a threshold value.

7. The method of claim 1, wherein comparing of the actual condition monitoring curve with the long-term monitoring baseline further comprises the steps of:
   performing frequency domain analysis on the actual condition monitoring curve;
   monitoring a characteristic fault frequency band; and
   sending out a warning if an amplitude of the fault frequency band exceeds a threshold value.

\* \* \* \* \*